United States Patent Office 3,016,483
Patented Jan. 9, 1962

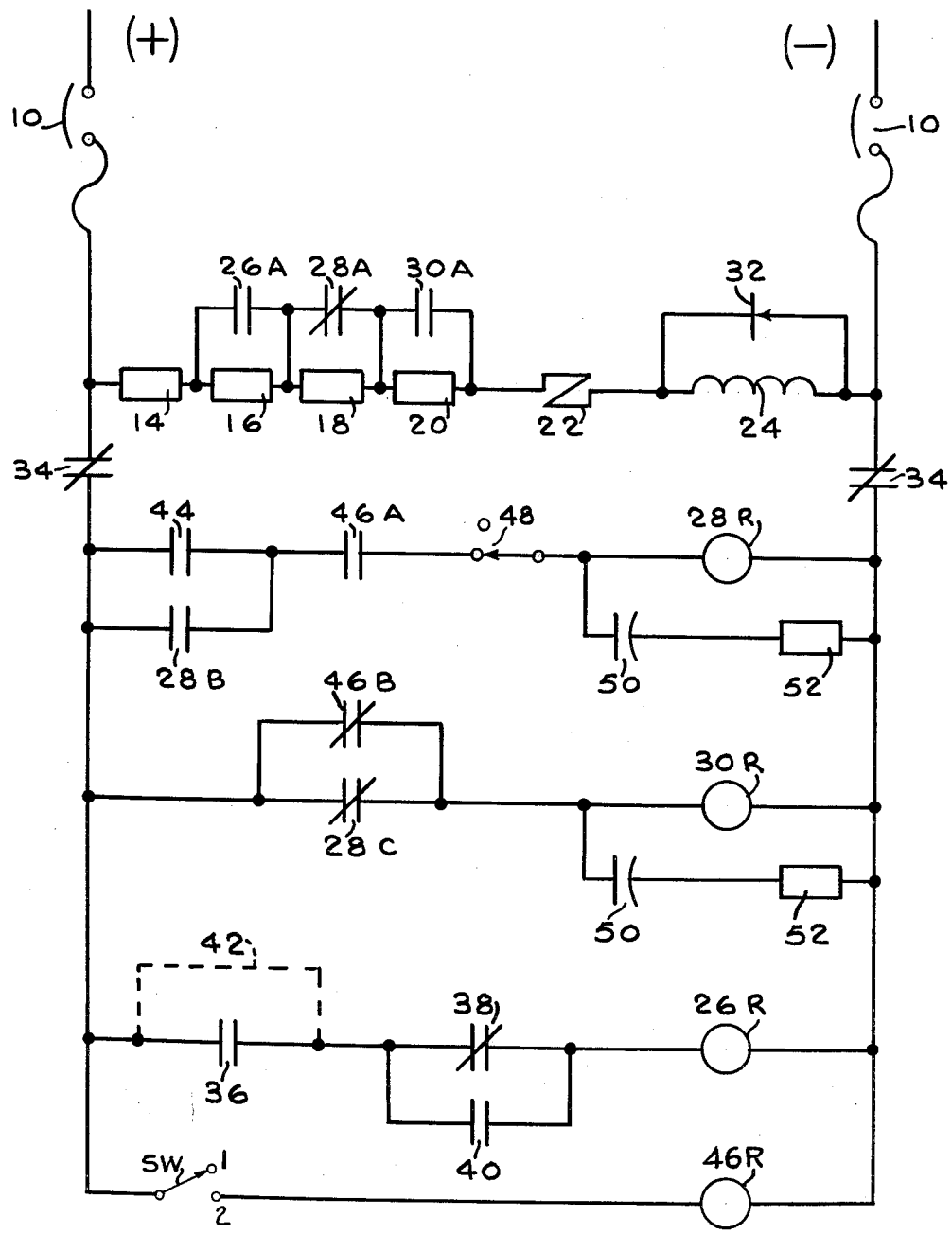

3,016,483
MOTOR CONTROL SYSTEM
Douglas W. Fath, Brookfield, and Charles E. Smith, Milwaukee, Wis., assignors to Cutler-Hammer, Inc., Milwaukee, Wis., a corporation of Delaware
Filed Mar. 17, 1958, Ser. No. 722,016
4 Claims. (Cl. 318—403)

This invention relates to improvements in systems for the control of electric motors having shunt field or the control of the field winding of a dynamoelectric machine.

Shunt field D.C. motors of the reversible type are advantageous in the operation of skip cars in blast furnace chargers where a momentary over-rating high starting torque is required to start a loaded skip car from its nearly vertical exit from the loading pit, followed by an increase in speed after the skip car leaves the pit and enters a less steep section or high speed zone of its travel and then a deceleration as the skip nears the end of its travel at the dumping station.

The object of this invention, therefore, is to provide a system which automatically: (1) causes the motor to have such momentary starting torque; (2) causes the motor to accelerate and decelerate smoothly; (3) provides an option for high torque during deceleration at the end of its present operation; (4) provides as a fail safe feature a stopping torque when there is a loss of power; and (5) provides stopping torque, normal start and controlled acceleration when stopped by emergency stop within the high speed zone.

These objects are obtained by a regulation of the current applied to the shunt field of the motor by the insertion and removal of resistance in timed sequence under the control of relays and limit switches. Such limit switches are operated by cam means geared to the skip car operating drum and thus their opening and closing is synchronized to the position and travel of a skip car or the like moved by the motor. A resistance is connected in series in the shunt field circuit. Part of this resistance is momentarily shunted or bypassed for a field forcing or increased field current to provide a high starting torque. There may be a momentary increase over-rated field current to obtain this effect. Another part of such resistance is normally shunted or bypassed and not in the shunt field circuit until unshunted and a further part of such resistance is normally unshunted and in the shunt field circuit. At the start of the motor the unshunted resistance is shunted by said relay circuits and limit switches and all the resistance is removed from the field to provide high starting torque. After the motor has started said relays and limit switchse reinsert the field forcing resistance. When a step-up speed zone is reached, said relays and limit switches first insert the normally shunted resistance. After a time delay, caused by capacitor-resistance circuits slowing the collapse field of some of said relays, the normally unshunted resistance is reinserted and the shunt field has been progressively weakened to cause full acceleration. When a step-down speed zone is reached said relays and limit switches permit the normally shunted resistance to be removed to cause a first deceleration and then said normally unshunted resistance to be removed after a similar time delay to cause a second deceleration. The field forcing resistance will be removed by said relays and limit switch when the slow-down zone is reached if a contact responsive to a second slow-down relay and limit switch is optionally left in circuit. The relays having immediate control of the resistances are energized through an undervoltage contact operated by an undervoltage relay circuit which is deenergized under emergency stopping, overloading, overtravel and like failures. When the undervoltage contact opens the normally shunted resistance will be removed to provide shunt field strengthening while stopping the motor under these conditions. When this undervoltage contact is again closed, the field forcing resistance will remain in the shunt field circuit and the other resistances will be out and then reinserted in the sequence described at starting to gradually accelerate the motor.

A specific embodiment of a motor regulatory system is shown in the schematic wiring diagram of the accompanying drawing. Only the shunt field of the motor is shown. For the sake of giving background to understand this system and its operation the following standard elements are briefly described but not illustrated: a D.C. generator with an adjustable voltage system changed to different values by relay circuits to produce different speeds of motor operation at different zones of travel; a D.C. motor with reversing contacts, shunt brake, and starting and stopping contacts; a cable drum operated by the motor to hoist and lower skip cars by a cable; a motor voltage responsive relay circuit; limit switches (some shown) and a limit switch operating cam motivated by the cable drum shaft.

With such a D.C. motor, the weakening of the shunt field causes acceleration and the strengthening of the shunt field causes deceleration and also provides high torque for starting. The field weakening is preferably done in synchronization with the changing of the generator voltage for producing different motor speeds.

The control circuit or system shown is supplied with 230 volts D.C. from a constant voltage source. Field circuit breakers 10 are placed in the positive and negative lines to protect the motor field. Connected in series from the positive line to the negative line are in the order named resistances 14, 16, 18 and 20, field loss coil 22, and shunt field 24 of the D.C. motor. Resistance 14 is a stabilizing resistance and is always in the shunt field circuit. Resistance 16 is removed momentarily from the shunt field circuit by the closing of a relay contact 26 in a bypass circuit around such resistance to increase field strength, and is hereafter referred to as field forcing. Resistance 18 is normally removed from the shunt field circuit by normally spring biased to closed position relay contact 28 in a circuit around such resistance. Resistance 18 is placed in the shunt field circuit to provide a first field weakening step when contact 28 is opened as hereafter explained for a first acceleration step. Resistance 20 is placed in and removed from the shunt field circuit by a relay contact 30 in a circuit around such resistance. Contact 30a is normally closed during starting and the first accelerating step to remove resistance 20 and strengthen the field. It opens as hereafter described for a second field weakening step and the second accelerating step. The field loss coil 22, when the voltage applied to the shunt field winding drops below a norm, causes an undervoltage relay circuit (not shown) to open stopping the motor. A rectifier 32 is in a circuit around the shunt field 24 to cause such field to weaken slowly as a resistance is inserted. The rectifier provides a low resistance discharge path for the shunt field and thus smooths out the change in current to cause the acceleration steps to be more smooth.

The direct control for the relay contacts 26A, 28A and 30A are a field forcing relay, a first field weakening relay, and a second field weakening relay. The circuits for these relays use the same source of D.C. voltage as the shunt field. It is desirable, however, to place in the negative and positive lines undervoltage relay contacts 34 which are normally open and are shown closed as an undervoltage relay circuit (not shown) is energized. Upon the opening of such undervoltage relay circuit by any of a number of faults the motor will stop and the shunt field control relays will be deenergized. Since the relay contact 28A is spring closed first field weakening resistance 18 will be removed from the shunt field circuit and provide some field strength for stopping or braking torque. This is a fail safe feature which would not occur if all resistances were inserted by such emergency stop.

Relay contact 26A is closed by coil 26R in the field forcing relay circut. This circuit has a normally open relay contact 36 and alternately operated limit switches 38 and 40. Whenever a skip car is in a skip pit for loading or the motor is at either end of its allotted travel, one of these limit switches will be closed by the action of the limit switch cable drum operated cam. At the starting of the motor under remote controls not shown the contact 36 will close and relay coil 26R will be energized to close contact 26A and remove resistance 16 to cause field forcing and provide the momentary starting torque as previously described. However, as shown, as the skip car is moved enough to overcome starting inertia (the motor has started revolving), the closed limit switch 38 or 40 will open and break this field forcing relay circuit to again insert resistance 16 and stop field forcing. The normally open contact 36 is closed by a slow-down relay (not shown) energized by the start button for the motor. A limit switch for this slow-down relay will keep such relay energized and contact 36 closed until the skip car reaches a first slow point near the dumping station. At this point such slow-down relay is deenergized and the contact 36 will open. Hence, when the skip car enters the dump station and one of the limit switches 38 or 40 closes, the field forcing relay coil 26R will not then be energized to close contact 26A and set up field forcing during deceleration. If such field forcing is desired during deceleration, it can be obtained by shorting out relay contact 36 by a jumper 42 shown in broken lines. Without contact 36 the field forcing relay circuit is under the complete control of the limit switches 38 and 40 and field forcing will be obtained at both starting acceleration and stopping deceleration.

Spring biased to closed position relay contact 28A shunting resistance 18 is controlled by a first field weakening relay 28R in circuit with a motor voltage relay contact 44 which closes when the motor terminal voltage reaches a set level (say 300 volts). The contact 44 is bypassed by normally open contact 28B which is closed when relay 28R is energized to lock out relay contact 44. Also in circuit with relay 28R is a normally open relay contact 46A closed by a speed control relay 46R energized by control switch SW (which may be either a manually operable switch or a machine controlled limit switch). A manually operated switch 48 in circuit with relay 28R remains closed for normal load operation. However, if by mistake an abnormal load is placed in the skip car in the charging pit, this switch is opened and the first field weakening circuit will be ineffective and acceleration will not occur with an overloaded skip. In shunt relation with the relay 28R is a capacitor 50 and resistance 52. This capacitance-resistance circuit opposes the collapse of the field in relay 28R and delays the opening of closed contacts 28A and 28C and closing of open contact 28B for one or two seconds. When the first field weakening relay circuit is energized, relay 28R causes normally closed relay contact 28A to open inserting resistance 18 in the shunt field circuit to lessen field strength and cause a first step acceleration of the motor. At the same time normally open relay contact 28B will close to shunt motor voltage relay contact 44 and normally closed relay contact 28C in the second field weakening relay circuit will open. The sequence of operation of this first field weakening circuit will be described in connection with the operation of the second field weakening circuit.

Contact 30A which controls the insertion and removal of second field weakening resistance 20 is operated by a second field weakening relay 30R in circuit with normally closed relay contact 28C of the first field weakening relay. Contact 28C is bypassed by a normally closed contact 46B opened by the energization of speed control relay 46R upon closing of control switch SW. The relay 30R, like relay 28R, also has a capacitor-resistance shunt circuit to delay the opening of relay contact 30A one or two seconds upon deenergization of relay 30R. When the second field weakening relay circuit is energized, relay 30R closes contact 30A and resistance 20 is removed to cause shunt field strengthening. When such circuit is deenergized, the resistance 20 is inserted for shunt field weakening and further increase of acceleration.

The normally open contact 46A in the first field weakening relay circuit and the normally closed contact 46B in the second field weakening relay circuit are alternately operated by speed control switch SW and the speed control relay 46R. This may be a fast-run relay circuit which is energized by a limit switch (controlled as before explained by a cable drum operated cam) after the skip car has left the pit and has reached the fast-run portion of its travel. When so energized, the contacts 46A and 46B are reversed from the position shown. This fast-run relay circuit is deenergized when the skip car reaches the end of such fast-run portion and the contacts 46A and 46B resume their normal position shown. The result of controlling contacts 46A and 46B by the fast-run relay circuit coordinates the weakening and strengthening of the shunt field with the voltage speed regulation control.

The timed sequence of shunt field strengthening and weakening in automatic operation, starting with a skip car in that pit which closes limit switch 38 and with the other contacts in the position shown is now described. The remote start button is pressed closing the motor contactors and the field forcing contact 36. Relay 26R is energized removing field forcing resistance 16. Relay 30R is energized (or remains energized) removing resistance 20. Resistance 18 remains removed. Shunt field 24 is now at full strength and the motor starts at maximum acceleration torque. Soon after such start limit switch 38 opens and relay 26R drops out placing resistance 16 back in the shunt field circuit to remove field forcing before the overburdening of the rated field has any damaging effect. The manually operable switch SW or its machine operated limit switch counterpart may then be closed to close open contact 46A and open closed contact 46B to set the field weakening relays for the next step. As the motor accelerates the motor terminal voltage reaches the set amount, the motor voltage relay closes the contact 44 energizing relay 28R (no delay upon energization) and resistance 18 is placed in the shunt field circuit causing a first field weakening to make the motor accelerate for a first step. Open relay contact 28B is closed to hold relay 28R during deceleration when motor voltage contact 44 again opens. This energization of relay 28R also opens relay contact 28C in the second field weakening relay circuit deenergizing relay 30R. However, the opening of relay 30R is delayed as explained and after one to two seconds of the first step acceleration with resistance 20 still out of the shunt field circuit, relay contact 30A will open and place resistance 20 in the shunt field circuit to apply the second field weakening. The motor will then accelerate in the second step. The transfer from start to first and to second step acceleration is smooth and gradual due to the timed sequence of weakening the shunt field and the delaying resistance to such weakening accomplished by the rectifier 32. Operation will continue at this speed until the skip car approaches the end of the fast speed part of its travel (near the top) when the slow-run relay drops out to open relay contact 36 and at the same time deenergizing the fast-run relay to cause relay contacts 46A and 46B to revert to their position as shown. This first energizes relay 30R and immediately removes resistance 20 strengthening the shunt field for the first step of deceleration. Relay 28R is also deenergized and after a time delay lets biased relay contact close to remove resistance 18 and strengthen the shunt field for the second deceleration step. Relay contact 28B in the first field weakening relay circuit will open to ready this circuit for the next starting sequence and relay contact 28C in the second field weakening relay circuit closes to hold relay 30R until the motor control circuit cuts out the motor. The motor, due to this sequence of field strengthening, is now decelerating smoothly. When the skip car is almost in the dump position limit switch 40 is closed. If the jumper 42 is not used, such closing will not produce any forcing field to aid the deceleration. If the jumper 41 is used, then relay 26R is energized and cuts out resistance 16 and the forcing field action further aids deceleration. When the skip car is at the end of its travel, limit switches (not shown) stop the motor (under dynamic braking) with the standard contractors.

When the skip car is being moved within the fast travel zone and an emergency stop is effected by the undervoltage relay, the shunt field relay control circuits will be deenergized by the opening of undervoltage relay contacts 34. The relay contacts 28, being spring biased, will return to the position shown and resistance 18 will be out of the shunt field circuit to keep some field strength to aid deceleration. When the relay contacts 34 again close with the pick-up of the undervoltage relay circuit, the motor will start. There will be no field forcing because both limit switches 38 and 40 are open. Normally closed relay contact 28C in the second field weakening relay circuit causes energization of this circuit as soon as contacts 34 close. The acceleration will therefore take place in the same sequence as previously described for the period after the field forcing was removed in the case of the initial start.

In its simple form this invention resides in the use of the two similar time delay relays 28R and 30R controlled from the speed control switch SW to insert one resistance with a time delay to weaken the field for acceleration and to shunt another resistance with a time delay to strengthen such field for deceleration. The use of such similar relays both with time delay simplifies the control system and results in field strength changes in an economical manner.

Such simple version of this invention can be applied to accelerate and decelerate a motor with its shunt field in the circuit herein described simplified by omitting elements: (1) field circuit breakers 10; (2) resistance 14; (3) resistance 16 and its shunting contact 26A; (4) field loss coil 22; (5) the field forcing relay circuit including relay coil 26R, relay contact 36, limit switches 38 and 40, and jumper 42; and (6) undervoltage relay contacts 34. In the operation of this simplified system, after power has been applied to initially energize relay 30R to cause contact 30A to shunt resistance 20 to provide high starting torque, the moving of switch SW to position 2 energizes relay 46R to close contact 46A and open contact 46B. Provided there is full armature voltage to maintain contact 44 closed, the closing of contact 46A energizes relay 28R to open contact 28A and insert resistance 18 to weaken the field energization (for a first step acceleration). This energized position is maintained by the closing of by-pass contact 28B. Since contact 28C is now open, the opening of contact 46B started relay 30R timing in the manner heretofore explained, and at the end of the delay period contact 30A opens to insert resistance 20 to further weaken the field energization (for a second step acceleration to normal running speed). The moving of switch SW back to position 1 deenergizes relay 46R opening contact 46A and closing contact 46B. Closing contact 46B energizes relay 30R to close contact 30A and shunt resistance 20 to accomplish a strengthening of the field energization (for a first step deceleration). The opening of contact 46A started relay 28R timing, in the manner heretofore described, and at the end of the delay period contact 28A closes to shunt resistance 18 and further strengthen the field energization (for a second step deceleration). Contact 28B will also open to break the self-maintaining circuit and contact 28C will close without any effect other than to reestablish the beginning position of the circuit for relay 30R.

Thus, timed control of the field energization is obtained by a simple circuit utilizing similar relays both of which release with time delay to economically weaken and strengthen the field energization in sequential steps.

We claim:

1. In a system for controlling a dynamoelectric machine having a field winding connected across a power supply source, a first and a second resistor in series circuit with said field winding, and control means for said machine comprising switch means, a first electroresponsive switch device of the timed release type normally shunting when unenergized said first resistor, a second electroresponsive switch device of the timed release type for shunting when energized said second resistor, means responsive to energization of said control means for energizing said second electroresponsive switch device to shunt said second resistor, and electrical means responsive to operation of said switch means for energizing said first electroresponsive switch device to effectively insert said first resistor in said series circuit and for initiating timed release of said second electroresponsive switch device, the latter effectively inserting said second resistor in said series circuit when it times out, said electrical means being thereafter responsive to re-operation of said switch means for energizing said second electroresponsive switch device to shunt said second resistor and for initiating timed release of said first electroresponsive switch device, the latter shunting said first resistor when it times out.

2. In a system for controlling electrical energization of a load connected across a power supply source, a first and a second resistor connected in circuit with said load, and means for controlling energization of said load comprising switch means, a first electroresponsive switch device of the timed release type normally shunting when unenergized said first resistor, a second electroresponsive switch device of the timed release type for shunting when energized said second resistor, said second electroresponsive switch device energizing to shunt said second resistor when power is applied to said means for controlling energization of said load, and control means responsive to operation of said switch means for energizing said first electroresponsive switch device to effectively insert said first resistor in said circuit and for initiating timing of said second electroresponsive switch device, the latter de-energizing to effectively insert said second resistor in said circuit when it times out, said control means being thereafter responsive to re-operation of said switch means for energizing said second electroresponsive switch device to shunt said second resistor and for initiating timing of said first electroresponsive switch device, the latter de-energizing to shunt said first resistor when it times out.

3. A system for the control of a field winding comprising: a source of power; a field winding, a first resistor and a second resistor connected in series circuit across said source; a first shunting circuit for said first resistor having a normally closed relay contact; a second shunting circuit for said second resistor having a normally open relay contact; control means having a normally open switch and a normally closed switch which upon operation simultaneously closes the normally open switch and opens the normally closed switch; a first timed release relay circuit energized across said source by the closing of the normally open switch of said control means to open said normally closed relay contact, and a second timed release relay circuit energized across said source by the reclosing of the normally closed switch of said control means to close normally open relay contact, said second relay circuit including a normally closed relay contact which is opened by the energization of said first timed release relay circuit.

4. In a control system for commutating first and second resistors which are connected in series with the field winding of a dynamo electric machine across a source of D.C. power supply, a first electroresponsive relay of the time delay release type which when deenergized and released establishes a shunt around the first resistor, a second electroresponsive relay of the time delay release type which when energized establishes a shunt around said second resistor, means for establishing energizing connections for said second relay, and means including switch means operable to one position to establish energizing connections to said first relay to cause immediate interruption of the shunt around said first resistor and to concurrently interrupt the energizing connections for said second relay to cause the latter to remove the shunt around said second resistor after a time delay interval, said switch means being operable to another position to recomplete the energizing connections for said second relay to cause immediate reestablishment of the shunt around said second resistor and to concurrently interrupt the energizing connections to said first relay to cause the latter to reestablish the shunt around said first resistor after a time delay interval.

References Cited in the file of this patent

UNITED STATES PATENTS

| | | |
|---|---|---|
| 1,794,736 | Seeger | Mar. 3, 1931 |
| 1,934,506 | King et al. | Nov. 7, 1933 |
| 2,081,977 | Bendz | June 1, 1937 |
| 2,400,971 | Barclay | May 28, 1946 |
| 2,549,307 | Griffes et al. | Apr. 17, 1951 |
| 2,666,175 | Seeger | Jan. 12, 1954 |
| 2,793,329 | Bivens | May 21, 1957 |